(12) United States Patent
Wilson et al.

(10) Patent No.: US 7,166,937 B2
(45) Date of Patent: Jan. 23, 2007

(54) POWER SUPPLY, AND ASSOCIATED METHOD, EXHIBITING SELECTABLE ELECTRICAL CHARACTERISTICS

(75) Inventors: Wayne Wilson, North Richland Hills, TX (US); Chi Hung Edmond Chan, Hong Kong (HK); Billy Edwin Reynolds, Jr., Fort Worth, TX (US)

(73) Assignee: Radio Shack Corporation, Fort Worth, TX (US)

( * ) Notice: Subject to any disclaimer, the term of this patent is extended or adjusted under 35 U.S.C. 154(b) by 232 days.

(21) Appl. No.: 10/787,820

(22) Filed: Feb. 26, 2004

(65) Prior Publication Data

US 2005/0127757 A1 Jun. 16, 2005

Related U.S. Application Data

(60) Provisional application No. 60/529,526, filed on Dec. 15, 2003.

(51) Int. Cl.
*G05F 3/06* (2006.01)
(52) U.S. Cl. ..................................... 307/151
(58) Field of Classification Search ................ 307/151
See application file for complete search history.

(56) References Cited

U.S. PATENT DOCUMENTS

| 5,347,211 | A | 9/1994 | Jakubowski |
| 5,886,422 | A | 3/1999 | Mills |
| 6,064,177 | A | 5/2000 | Dixon |
| 6,433,274 | B1 | 8/2002 | Doss et al. |
| 6,459,175 | B1 * | 10/2002 | Potega ........................ 307/149 |
| 6,643,158 | B2 | 11/2003 | McDonald et al. |
| 6,650,560 | B2 | 11/2003 | MacDonald et al. |
| 2002/0000793 | A1 * | 1/2002 | Hanaki ........................ 323/234 |
| 2003/0151936 | A1 | 8/2003 | MacDonald et al. |

* cited by examiner

*Primary Examiner*—Robert L. Deberadinis

(57) ABSTRACT

Apparatus, and an associated method, for a power converter that provides operative power to a load device. The characteristics of the operative power are selectable, permitting the power supply to be used to power load devices of differing power requirements. An indicator indicates that electrical characteristics, such as voltage levels and polarities, to be exhibited by the operative power. A signal is generated by a command generator and provided to a power source. The power source extracts the informational content of the command and generates operative power of the selected characteristics.

18 Claims, 3 Drawing Sheets

POWER SUPPLY, AND ASSOCIATED METHOD, EXHIBITING SELECTABLE ELECTRICAL CHARACTERISTICS

CROSS-REFERENCE TO RELATED APPLICATIONS

The present invention claims the priority of Provisional Patent Application Ser. No. 60/529,526, filed on 15 Dec. 2003, this contents of which are incorporated herein.

The present invention relates generally to a manner by which to provide operative power sourced at an energy source to a load device, such as a consumer electronic device that is of selected characteristics, that is, characteristics suited best to power the load device. More particularly, the present invention relates to apparatus, and an associated method, by which to control the characteristics of the electrical energy applied to the load device.

The characteristics, such as voltage levels and voltage polarities of the energy applied to the load device are selectable. Selection is made at a connector assembly positioned proximate to the load device and indications of the selection are modulated to form a modulated signal that is communicated to a power source. Improved adaptability, and corresponding power regulation, is provided as an increased range of selection of electrical characteristics to be exhibited by the operative power is provided.

BACKGROUND OF THE INVENTION

A large variety of consumer, and other, electronic devices are readily available throughout modern society to perform many varied functions. Many of such devices are practical necessities of modern life. Ready availability of, and operation of, such devices is expected by many.

Different ones of the electronic devices are formed of different types of circuitries, exhibiting differing load characteristics. And, concomitant with the differing load characteristics are differing power requirements. For instance, different circuitries require application of different voltage levels and different voltage polarities. The circuitries of the electronic devices typically are direct-current circuits, i.e., operate using direct current energy. However, due to the differing load characteristics of different ones of the electronic circuitries, different levels of operative power are needed by the different ones of the circuitries to power the circuitries.

In North America, and also many other portions of the world, power grids are in place that provide 110 volt, alternating current energy, the power derived from which is used to power electronic devices. When the electronic circuitries of the electronic devices are operative at power levels that differ with the power levels of the power provided by the power grid, power converters are needed to convert the grid-supplied power into energy of characteristics needed to operate the electronic device.

A power converter operates to convert the energy characteristics of the grid-supplied power into characteristics appropriate to power the electronic device. As many typical electronic devices are formed of circuitries that utilize direct current energy, alternating current to direct current conversion is performed and voltage step-down, typically, of the voltage levels of the power is performed by a power converter that performs the power conversion.

When the energy supplied to the power converter is of characteristics, such as power supplied by an automotive battery power supply, the power converter operates in analogous manner to convert the supplied power into energy of characteristics appropriate to power the electronic device.

While power converters are sometimes of set characteristics, i.e., constructed to be operated in conjunction with only one, or one type of, electronic device, power converters that exhibit selectable devices are also available. Selectable power converters, that is, power converters that are capable of converting input energy of first characteristics into output energy of second characteristics are able to be used to power different electronic devices.

The selectable power converters are capable of exhibiting output energy characteristics of two or more characteristic values. And, some power converters are capable, at least in a step-wise manner, to generate output energy characteristics of numbers corresponding to the available steps.

U.S. Pat. No. 5,886,422 discloses, for example, a selectable output power converter. The output power converter disclosed therein utilizes a key that is used to determine the output characteristics of the output energy formed by the converter. The key includes a resistor, and the value of the resistor is determinative of the output energy characteristics of the converter. A key is inserted into a key way. And, once properly inserted, the value of the resistor forms a portion of the circuit of the power converter, and the value of the resistor is determinative of the energy characteristics exhibited by the power converter. The adaptability of the converter, however, is limited. The use of a passive device that must be physically connected to form a portion of the electrical circuit of the power converter generally requires that a separate key, and associated resistor, be available to form a portion of the circuit of the power converter to define the electrical characteristics of the output energy formed by the power converter. That is to say, the number of values that can be exhibited by the output energy formed by the power converter corresponds to the number of keys, and associated resistors, that are available by which to form portions of the electrical circuit thereof. The adaptability of the converter is, therefore, limited to the availability of keys to form portions of the power converter. In the event that a key is lost or misplaced, the power converter loses its capability of generating energy of energy characteristics corresponding to the lost or misplaced key.

And, other constructions of conventional power converters generally also exhibit limited adaptability for the same, or other, reasons. An improved power converter is, therefore, needed. The improved power converter would provide selectability that does not rely merely upon connection of a resistive element, or other passive component, into the circuit of the power converter, thereby to provide a power controller of improved operating adaptability.

SUMMARY OF THE INVENTION

The present invention, accordingly, advantageously provides apparatus, and an associated method, by which to provide operative power sourced at an energy source to a load device, such as a consumer electronic device that is of selected characteristics, that is, characteristics suited best to power the load device.

Through operation of the an embodiment of the present invention, a manner is provided by which to control the characteristics of energy applied to the load device. The characteristics to be exhibited by the electrical energy are selected, and the energy of the selected characteristics is caused to be generated, thereafter to be applied to the load device.

The characteristics of the energy comprise, for instance, the voltage level and polarity of the energy that is to be generated and applied to the load device. Selection is made at a connector assembly that is positionable proximate to the load device. Indications of the selection are modulated to form a modulated signal that is communicated to a power source. And, the power source converts input energy into output energy of the selected characteristics. The output energy is provided to the load device through appropriate connectors, and the load device is powered therefrom.

Improved adaptability is provided as an increased range of selection of characteristics of the output energy for application to the load device is provided.

In one aspect of the present invention, a housing tip member is formed that supports a connector that is connectable with the load device in electrical connection therewith. The connector is, in turn, connected to receive the output energy output by a power converter. The output energy is of the selected characteristics, appropriate to power the load device.

In another aspect of the present invention, the tip member housing supports a selection indicator that indicates the selection of the electrical characteristics that the energy to be applied to the load device is to exhibit. The indicator, for instance, is formed of a selection switch switchingly positionable in a selected switch position. The switch position into which the selection switch is positioned is determinative of the selection of the electrical characteristics. In one implementation, two separate selection switches are utilized. A first of the selection switches identifies the voltage levels to be exhibited by the energy that is applied to the load device. And, a second switch is positionable into a selected switch position to identify the polarity of the energy that is to be applied to the load device. Selections made through the positioning of the switch elements into the respective switch positions are utilized to indicate to a selectable power supply the selection. And, responsive to the selection, the selectable power supply forms electrical energy of the selected characteristics that is applied to the load device to provide operative power thereto.

In another implementation, indications of the selected electrical characteristic or characteristics are provided through use of a radio frequency identification (RFID) scheme. The load device includes capacitive, inductive, or other, tags that identify the electrical characteristics of energy that is to power the load device. Sensors, or other detectors, formed at the tip member housing, or elsewhere, detect the values of the tags, thereby to provide the indications of the selected characteristic or characteristics. When the RFID tags and sensors are utilized, manual switching of switches into appropriate switch positions is obviated, reducing the possibility of mispositioning of the switch positions and misidentifying the selected electrical characteristics of energy to be applied to the load device.

In another aspect of the present invention, the indications of the selected characteristics that are selected to be exhibited by the power supply are provided to a signal-generative element positioned at the tip housing member. The signal generative element in one implementation, forms an integrated circuit that generates pulse-coded, modulated signals. The modulated signals are of values responsive to the indications of the selected electrical characteristics that are selected to be exhibited by the energy that is provided to the load device. The signal generative element is connected to the power supply by way of a signal line. The signal line interconnects the signal generative element and the power supply, thereby to permit the signal generated by the element to be provided to the power supply. Because a modulated signal is used to convey the information, the tip member and the power supply need not be positioned in close proximity to one another.

In a further aspect of the present invention, the power supply includes a detector for detecting the modulated signal formed by the signal generative element and sent by way of the signal line to the power supply. The detector detects the values of the signal. The power supply further includes an energy characteristic selector that is operable responsive to detection of the signals by the signal detector. The energy characteristic selector causes the selected energy characteristics of the energy provided by the power supply to be of the selected characteristics.

Increased adaptability is provided as an increased range, precision or other selection criteria is possible through operation of an embodiment of the present invention.

In these and other aspects, therefore, apparatus, and an associated method, facilitates supply of electrical energy, sourced at an energy source, of selected energy characteristics to power a load device. The load device exhibits load characteristics. An energy-characteristic selection identifier identifies the selected energy characteristics of the electrical energy needed to power the load device. A command generator is adapted to receive indications of identifications made by the energy-characteristic selection identifier. The command generator generates electrical commands of values responsive to indications of the identifications made by the energy-characteristic selection identifier. The electrical commands are applied to the energy source to instruct the energy source to generate energy of the selected energy characteristics.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
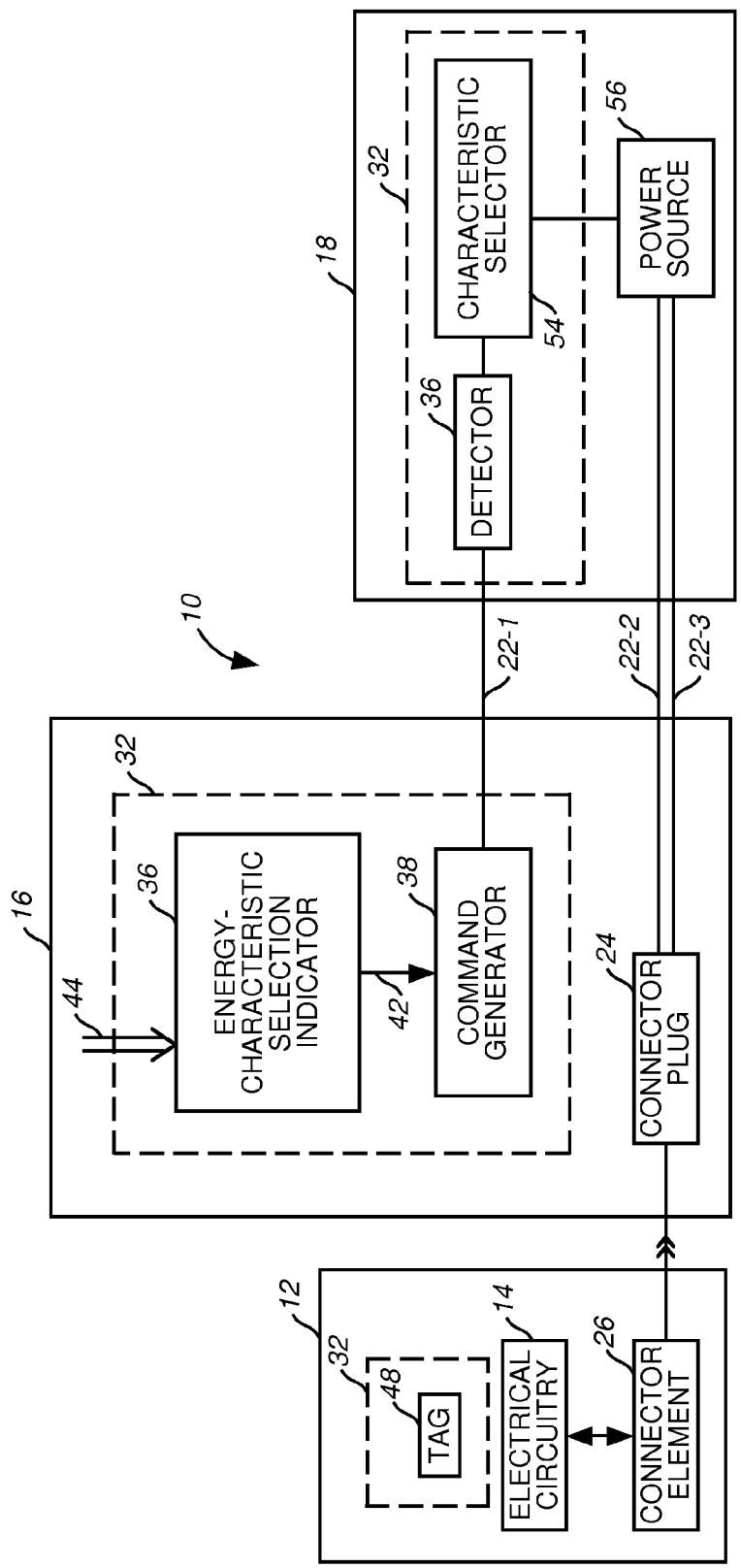
FIG. 1 illustrates a functional block diagram of a power controller assembly including the apparatus of an embodiment of the present invention positioned proximate to a load device that is to be powered by the power controller.

Referring first to FIG. 1, a power controller, shown generally at 10, is positionable to provide operative power to a load device 12. The load device is, in the exemplary implementation, a consumer electronic device that contains electrical circuitry 14 that, when provided with appropriate levels of operative power, operates to provide the functions or services associated with the consumer electronic device. While the following description of exemplary operation of an embodiment of the present invention shall be described with respect to its implementation in which the load device 12 forms a consumer electronic device, operation of an embodiment of the present invention is analogously also implementable by which to provide other types of load devices with operative power of selected characteristics.

The power controller includes a tip member housing 16 and a power supply 18. The power supply and tip member housing are connected together by way of conductive lines 22. Here, one of the lines 22 forms a signal line 22-1, and the others of the lines 22 form power lines 22-2 and 22-3.

The tip member housing includes a connector plug 24 that connectingly engages with a corresponding connector element 26 of the load device 12. When the connector plug is suitably connected with the connector element 26, electrical energy sourced at the power supply 18 is selectably provided to the load device by way of the power lines 22 and the connectors 24 and 26. Through appropriate selection of the characteristics of the electrical energy forming the operative power, the load device is powered with operative power of characteristics appropriate for the power requirements of the load device.

The power controller includes apparatus 32 of an embodiment of the present invention. The apparatus 32 facilitates the application of the operative power of selected characteristics to the load device, better to ensure that the load device is provided with the operative power of the selected characteristics. The apparatus permits adaptive selection, and reselection, of the energy characteristics that are exhibited by the operative power formed by the power supply 18. Thereby, the power converter is able to be used to provide operative power to different load devices 12 that exhibit differing load requirements and operative power of differing electrical characteristics thereto. The power converter is thereby multi-device capable, i.e., capable of powering any of various load devices. The elements that form the apparatus 32 in the exemplary implementation are functionally represented in the figure. And, the functions carried out by the respective ones of the elements are implementable in any desired manner including, in part, by algorithms executable by processing circuitry or by application specific integrated circuits, or other electronic components.

The apparatus 32 embodied at the tip member housing here includes an energy characteristic selection indicator 36 and a command generator 38. The indicator 36 operates to provide indications of the selections of the selected characteristics that are to be exhibited by the energy sourced at the power supply 18 for powering the load device 12. Indications of the selections are provided to the command generator, here indicated by way of the line 42.

The command generator operates, responsive to delivery of the indications by way of the line 42, to generate a signal that is communicated upon the signal line 22-1 for delivery to the power supply 18. The signal generated by the command generator is a modulated signal, e.g., a pulse-width, or other pulse-modulated, signal communicated at a base band level.

The indications provided by the indicator on the line 42 are provided responsive to selection of the energy characteristic or characteristics, here indicated to be provided to the indicator by way of the lines 44. In one implementation, the indicator 36 forms one or more selections which is positionable in switch positions that are accessible by a user. The arrows 44, in this implementation, are representative of user action that positions the switches into the selected switch positions. In another implementation, the identifier 36 forms a non-contact sensor that senses information, and the signals generated on the line 42 are representative of the sensed information. In one implementation, the sensor forms an inductive, capacitive, or other sensor that senses inductive, capacitive, or other indicia contained at a tag member 48. The tag member 48 is positioned, for instance, on the body of the load device. And, by positioning the tag member in proximity to the identifier, the indicia of the tag member is provided to the indicator, and the indications formed on the line 42 are formed responsive thereto. In this implementation, selection is made without need of the user to position switch elements in proper switch positions.

The power supply 18 includes further elements of the apparatus 32. The elements of the apparatus 32 embodied at the power supply are also functionally represented, implementable in any desired manner. Here, the apparatus includes a detector 52 that is connected to, or is otherwise positioned to receive indications of the signals generated upon the signal line 22-1 by the command generator. The detector 52 operates to detect the values of the signals communicated thereon. The detector, in turn, is connected to a characteristic selector 54. The characteristic selector 54 selects the electrical characteristics that are to be exhibited by electrical energy generated by a power source 56 of the power supply. Responsive to the selections made by the selector 54, the power source generates operative power of electrical characteristics corresponding to the selections that are made.

In the exemplary implementation, the electrical characteristics that are selected comprise the voltage levels of the operative power and the polarities of the operative power. In other implementations, additional, or alternate, characteristics are selectable.

Figure 2:
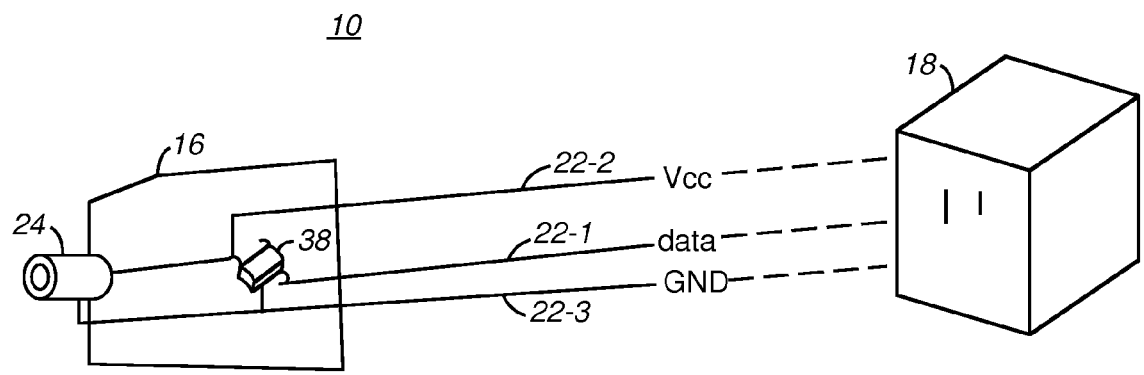
FIG. 2 illustrates a partial functional block, partial perspective, view of the power controller including an embodiment of the present invention, shown in FIG. 1.

Turning next to FIG. 2, the power supply 10 is again shown. And, the power supply is again shown to include the tip member housing 16 and the power supply 18. The housing and the power supply are interconnected by way of lines 22. The power supply 18 is connected, in turn, to a conventional household outlet, or the like, to receive power-grid sourced electrical power.

The connector plug 24 embodied at the tip member housing is here shown to be supported to protrude from the housing to facilitate its connection to a corresponding connector element 26 (shown in FIG. 1) of a load device, such as the load device 12 (also shown in FIG. 1). The connector plug 24 is connected to the power lines 22-2 and 22-3, here indicated to be able to be a voltage, $V_{cc}$, line and a ground line. When the lines 22 are connected to the power supply 34 and, the power supply is connected to the electrical outlet (not shown), operative power of selected characteristics is provided, by way of the connector plug 24 to power a load device.

The command generator 38 is here formed of a four-pin piece, an integrated circuit that is connected to receive the indications of identifications made by the energy characteristic selection identifier 36 (shown in FIG. 1). Responsive to the values of the indications, the circuit forming the command generator generates a pulse-modulated signal on the signal line 22-1 for delivery to, and detection at, the power supply 18. The circuit forming the command generator is also powered by the energy generated on the power lines 22-2 and 22-3. Here, separate pins of the circuit are connected to the separate ones of the power lines and another of the pins is connected to the signal line. Modulated signals, such as the aforementioned pulse-modulated signals, are generated by the circuit forming the command generator on the signal line 22-1, delivered to the power supply 18, and the power supply 18 is caused to generate electrical energy of characteristics corresponding to the selected characteristics indicated by the values of the modulated signal.

Figure 3:
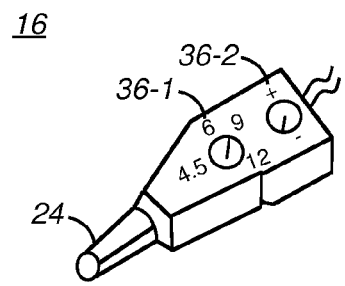
FIG. 3 illustrates a perspective view of a portion of the power controller shown in FIGS. 1–2 pursuant to an embodiment of the present invention.

FIG. 3 illustrates again the tip member housing 12 that forms part of the power supply of an embodiment of the present invention. Here, the connector plug 24 is again shown to protrude beyond a side surface of the housing. And, the lines 22 are also again shown to extend beyond the tip member housing. In this implementation, the energy characteristic selection identifiers are formed of switch elements 36-1 and 36-2. The switch elements are switchingly positionable in two or more switch positions. In the exemplary implementation, the left-most (as shown) switch element is switchingly positioned into a switch position to select the voltage levels that are to be exhibited by operative power provided by the power supply of which the tip housing member forms a portion. And, here, the switch element is positionable in a switch position corresponding to a voltage level between zero and twelve volts. User selection of the selected voltage levels of the operative power to be provided by the power converter is made through appropriate positioning of the switch element 36-1. And, the right-most (as shown) switch element here is switchingly positionable in a selected one of two switch positions to identify a voltage polarity that is to be exhibited by the operative power supplied by the power converter. A user positions the switch element 36-2 into a selected one of the switch positions to identify the voltage polarity to be either a positive or negative voltage polarity. The switch elements are connected to the command generator 38 (shown in FIGS. 1–2), and the command generator generates modulated signals indicative of the selected values.

In one implementation, the tip member housing is releasably engageable with the power source. When not attached, the power source generates a low voltage, e.g., 0.7 volts dc, or the minimum power level required to 'wake up' the chip in the tip housing member once it is attached. Once attached, the data formed at the tip housing member is communicated to the power source. For example, the same values, or packets, are repeatedly communicated by the tip housing member without an acknowledgment (ack) as a reply in a one-way communication scheme. Alternately, a two-way scheme is instead provided. The power source is caused to generate power of the selected characteristics. When the tip housing member is removed, the voltage is returned to the low voltage level. In one implementation a watch dog timer is used to reduce the power levels when the timer times out.

Figure 4:
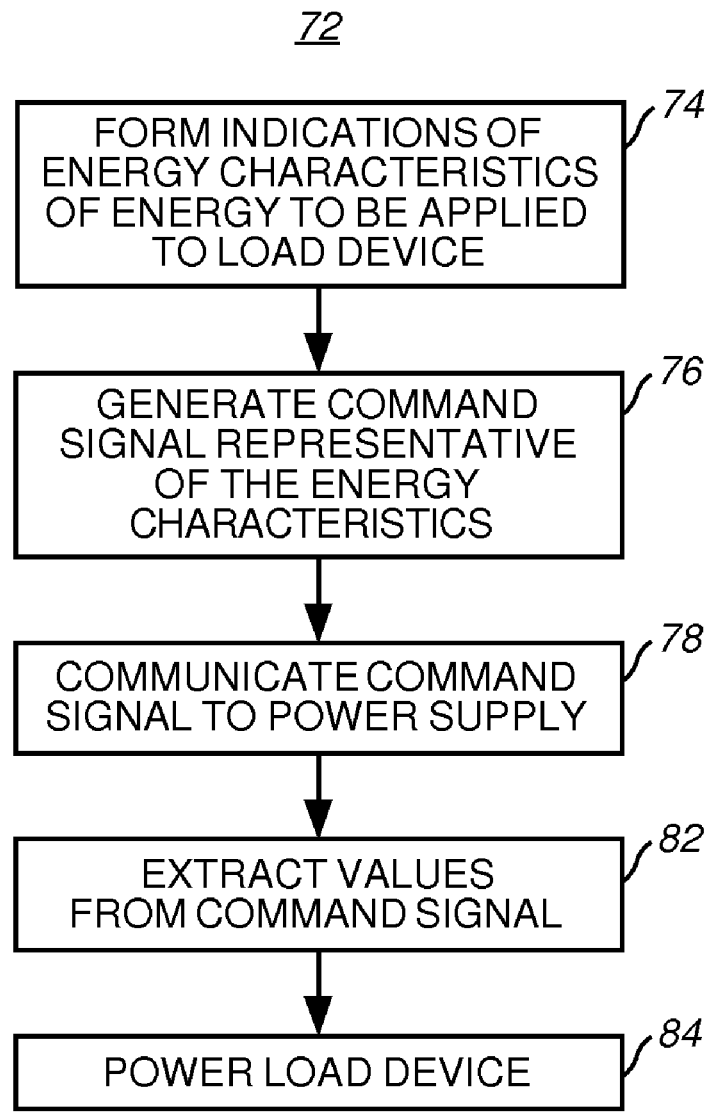
FIG. 4 illustrates a method flow diagram listing the method steps of the method of operation of an embodiment of the present invention.

FIG. 4 illustrates a method, shown generally at 72, representative of the method steps of the method of operation of an embodiment of the present invention. The method 72 facilitates application of electrical energy to a load device that exhibits load characteristics.

First, and as indicated by the block 74, indications of the selected energy characteristics to be exhibited by the electrical energy provided to the load device are formed. And, as indicated by the block 76, a command signal is generated that is of values representative of the indications of the selected energy characteristics.

Thereafter, and as indicated by the block 78, the command signal is communicated to a power supply and detected thereat. The values of the commands are extracted from the signal and are used to select, indicated by the block 82, the energy characteristics of the energy sourced at the power source. Then, and as indicated by the block 84, the energy of the selected characteristics is used to power the load device.

The previous descriptions are of preferred examples for implementing the invention, and the scope of the invention should not necessarily be limited by this description. The scope of the present invention is defined by the following claims.

What is claimed is:

1. Apparatus for facilitating supply of electrical energy, sourced at an energy source, of selected energy characteristics to power a load device that exhibits load characteristics, said apparatus comprising:
   a tip member housing having a connector configured to connect with the load device;
   an energy-characteristic selection identifier embodied at said tip member housing, said energy characteristic selection identifier configured at least selectably to identify the selected energy characteristics of the electrical energy to power the load device;
   a command generator embodied at said tip member housing and adapted to receive indications of identifications made by said energy-characteristics selection identifier, said command generator configured to generate electrical commands of values responsive to the indications of the identifications made by said energy-characteristic selection identifier, the electrical commands for application to the energy source to instruct the energy source to generate energy of the selected energy characteristics.

2. The apparatus of claim 1 wherein said energy-characteristic selection identifier comprises at least a first selection switch, said at least the first selection switch positionable into a selected switch position, the selected switch position into which said first selection switch is positioned identifying, at least in part, the selected energy characteristics of the electrical energy needed to power the load device.

3. The apparatus of claim 2 wherein the selected energy characteristics comprise a selected voltage level, and wherein the selected switch position into which said first selection switch is positionable identifies the selected voltage level.

4. The apparatus of claim 2 wherein the selected energy characteristics comprise a selected voltage polarity and wherein the selected switch position into which said first selection switch is positionable identifies the selected voltage polarity.

5. The apparatus of claim 2 wherein said at least the first selection switch comprises said first selection switch and at least a second selection switch, wherein the selected energy characteristics of the electrical energy needed to power the electrical device comprises a first selected energy characteristic and a second selected energy characteristic, the selected switch position into which said first selection switch is positioned identifying the first selected energy characteristic, and said second selection switch also positionable into a selected switch position, the selected switch position into which said second selection switch is positioned identifying the second selected energy characteristic.

6. The apparatus of claim 5 wherein the first selected energy characteristic comprises a selected voltage level, wherein the second selected energy characteristic comprises a selected voltage polarity, wherein the selected switch position into which said first selection switch is positioned identifies the selected voltage level, and wherein the selected switch position into which said second selection switch is positioned identifies the selected voltage polarity.

7. The apparatus of claim 1 wherein the electrical commands generated by said command generator generates comprise modulated signals that are of values that identify the selected energy characteristics of the electrical energy needed to power the load device.

8. The apparatus of claim 7 wherein the modulated signals forming the electrical commands generated by said command generator comprise pulse-modulated signals.

9. The apparatus of claim 7 wherein said command generator comprises a four-pin programmed part adapted to receive the indications of the identifications made by said energy-characteristic selection identifier, said four-pin programmed part for generating the modulated signals responsive thereto.

10. The apparatus of claim 9 further comprising a conductive data line connectable between said four-pin programmed part and the energy source, the modulated signals generated by said four-pin programmed part communicated upon the data line for delivery to the energy source.

11. The apparatus of claim 10 further comprising a detector embodied at the energy source, said detector for detecting values of the modulated signals communicated thereto by said four-piece programmed part.

12. The apparatus of claim 11 wherein the energy source further comprises an energy characteristic selector adapted to receive indications of detections made by said detector, said energy characteristic selector operable responsive thereto for selecting the energy characteristics of the electrical energy sourced thereat.

13. A method for facilitating supply of electrical energy, sourced at an energy source, of selected energy characteristics to power a load device that exhibits load characteristics, said method comprising the operations of:
   identifying, at a tip member having a connector that connects with the load device, the selected energy characteristics of the electrical energy needed to power the load device;
   forming, at the tip member, electrical commands of values responsive to indications of the selected energy characteristics identified during said operation of identifying;
   providing the electrical commands formed, at the tip member, during said operation of forming to the energy source; and
   generating electrical energy at the energy source of the selected energy characteristics, responsive to the electrical commands provided thereto during said operation of providing.

14. The method of claim 13 further comprising the operation of powering the load device with the electrical energy generated during said operation of generating.

15. The method of claim 13 wherein the electrical commands formed during said operation of forming comprise modulated signals.

16. The method of claim 15 wherein said operation of forming is performed remote from the energy source.

17. The method of claim 13 wherein said operation of providing comprises the operations of sending the electrical commands upon a wireline extending to the energy source.

18. Apparatus for facilitating supply of electrical energy, sourced at an energy source, of selected energy characteristics to power a load device that includes a tag member containing indicia of the load device, said apparatus comprising:
   an energy-characteristic selection identifier comprising a non-contact sensor configured to sense indicia contained at the tag member of the load device;
   a command generator adapted to receive indications made by said energy-characteristic selection identifier of the indicia contained at the tag member, said command generator configured to generate electrical commands of values responsive to the indications made by said energy-characteristic selection identifier, the electrical commands for application to the energy source to instruct the energy source to generate energy of the selected energy characteristics.

* * * * *